United States Patent [19]  [11] 4,293,239
Petty et al.  [45] Oct. 6, 1981

[54] METHOD OF ERECTING A VERY LARGE DIAMETER OFFSHORE COLUMN

[75] Inventors: Terry D. Petty, New Orleans; Carmon R. Costello, Kenner; Gude P. Rao, New Orleans; David Gansar, Metairie, all of La.

[73] Assignee: Odeco Engineers Inc., New Orleans, La.

[21] Appl. No.: 25,961

[22] Filed: Apr. 2, 1979

[51] Int. Cl.³ .............................................. E02B 9/00
[52] U.S. Cl. ..................................... 405/195; 405/52; 405/203
[58] Field of Search ............... 405/204, 203, 195, 205, 405/52, 207, 208

[56] References Cited
U.S. PATENT DOCUMENTS

| | | | |
|---|---|---|---|
| 2,217,879 | 10/1940 | Willey | 405/204 X |
| 3,464,212 | 9/1969 | Yamagata et al. | 405/204 |
| 3,698,198 | 10/1972 | Phelps | 405/204 |
| 4,062,313 | 12/1977 | Stram | 405/205 |
| 4,073,155 | 2/1978 | Schiemichen | 405/205 X |
| 4,116,009 | 9/1978 | Daubin | 405/195 X |
| 4,181,453 | 1/1980 | Yache | 405/203 |

FOREIGN PATENT DOCUMENTS

1501861  2/1978  United Kingdom ............... 405/204

Primary Examiner—Dennis L. Taylor
Attorney, Agent, or Firm—Michael P. Breston

[57] ABSTRACT

The method involves erecting a very large-diameter column from a plurality of buoyant columnar members at a selected site in a body of sea water. Each columnar member is floated erect to the site. The first or lowermost columnar member is pulled down and fully submerged to a predetermined depth over the site. The second columnar member is then positioned directly over the lowermost member. The lowermost member is allowed to move up and lift the second member out of the water. The two columnar members are securely interconnected to each other in a watertight fashion. The partial column is then pulled down to a fully submerged condition and the third columnar member is positioned directly over the second member. The partial column is allowed to move up and lift the third member out of the water. A secure watertight connection is made between the third columnar member and the second columnar member. This process of erection is repeated for as many columnar members as may be required to obtain the full length for the desired column. The pulling down of the columnar members can be effected by winches mounted on a platform. The winches have lines on which anchor weights are suspended. The weights are disposed on the sea bed in a suitable pattern around the selected site. The lifting of the columnar members is effected by the inherent buoyancy of the columnar members.

3 Claims, 31 Drawing Figures

METHOD OF ERECTING A VERY LARGE DIAMETER OFFSHORE COLUMN

BACKGROUND OF THE INVENTION a. Field of the Invention

This invention generally relates to the offshore construction art and, more particularly, to the art of erecting a buoyant, very long, large-diameter column and of maintaining the column fully submerged above the sea bottom to allow the column to draw cold water from the sea bottom.

b. The Need for the Invention

An Ocean Thermal Energy Conversion (OTEC) system can provide an inexhaustible electric power source which utilizes the temperature difference between the warm surface water and the cold water found at lower depths in the oceans to produce electricity. Since the oceans cover approximately 70% of the earth's surface, it will be appreciated that they can provide a continuously renewable, non-polluting energy source.

Basically an OTEC system comprises a power plant, a suitable floating platform to house the equipment necessary for running the plant, and energy conversion and utilization subsystems. The power plant can be based on the closed Rankine thermodynamic cycle which utilizes a working fluid such as ammonia, capable of evaporating and condensing over a small temperature range. Warm sea water is pumped into an evaporator where the ammonia liquid is heated and vaporized. The ammonia vapor is fed into a turbo-generator where the thermal energy of the vapor is converted into mechanical energy, and then into electric power. The vapor leaving the turbine is fed into a condenser where it is cooled and condensed into its liquid state. The condenser receives cooling water through and from a very long pipe column which reaches down into the ocean depths where the relatively cold water is found. Condensed ammonia is pressurized and returned to the evaporator thereby completing the Rankine cycle.

It is anticipated that such an OTEC power plant would require approximately 6 million gallons per minute of warm water flow, and an equivalent volume of cold water flow for each 100 MWe of net electric power.

This invention is concerned only with the construction and erection of the cold water pipe column which is required in the above described OTEC power plant. The invention, however, can find utility wherever a very large diameter offshore column is required to be erected from columnar members.

Sites for OTEC electricity generating plants are most suitable in latitudes not more than approximately 20° north and south of the equator. Such sites are available, for example, in the Gulf of Mexico from Florida to Texas. Other suitable sites could be near Hawaii and Puerto Rico.

SUMMARY OF THE INVENTION

Generally, the invention relates to a method of erecting from buoyant columnar members a very long, large diameter column which can be used as the submerged cold water pipe in an OTEC electricity-generating plant. Each columnar member is made in an onshore fabrication plant. The column is provided with buoyancy control means which can include conventional ballasting chambers. Anchor weights on the sea bed are suspended from winch lines and are used to pull down the columnar members during the erection process.

More specifically, a suitable floating platform is first positioned over the selected erection site. A plurality of large anchor weights are consecutively suspended on and lowered by the winch lines to the sea bottom. The winches are mounted on the deck of the platform. The buoyant columnar members are then successively floated erect to the platform. The lowermost or first columnar member is pulled down to fully submerge the same using the winch lines and the anchor weights. The second columnar member is positioned directly over the submerged first columnar member. The winch lines are then slackened to allow the inherent net positive buoyancy of the first member to completely lift the second columnar member above the water surface. The two columnar members are then securely interconnected in a watertight fashion, by any conventional means, in a dry atmosphere.

The two-member column is then pulled down to allow the third columnar member to become positioned directly over the second member, and the above steps are repeated until the entire column becomes fully erected. The winch lines are then transferred from the winches to the submerged, fully-erected column, and the suspended anchors will maintain the buoyant column in its desired position between the top and bottom surfaces of the water body.

DETAILED DESCRIPTION OF THE INVENTION

Throughout the drawings the same or similar reference characters will be used to designate the same or similar parts to facilitate the understanding of the description.

The following words are frequently used herein: "bed" means the floor or bottom of the sea; "trim" when used as a verb means the act of adjusting the net buoyancy of a columnar member or of a plurality of columnar members as between positive and negative buoyancy, and the words derived from "trim" will have the same connotations.

A "columnar member" generally means a tubular member, pipe or conduit which can be made of any suitable material such as concrete, steel, etc. The preferred material is light-weight reinforced concrete. By inherent positive buoyancy is meant the ability of individual columnar members or of the fully erected column to move from a fully submerged position up to and above the water surface depending on the extent (sometimes expressed in %) of positive buoyancy involved, and trimming from this inherent positive buoyancy condition.

It will be understood that in a practical embodiment of a columnar member, water-tight compartments or chambers are provided and means such as pipes, valves, etc., are used to controllably flood or empty such compartments during the column erection process. Since such trimming is widely used in the offshore construction art, no detailed description thereof will be further provided herein.

A. DEPLOYMENT OF THE ANCHOR WEIGHTS

Figure 1:
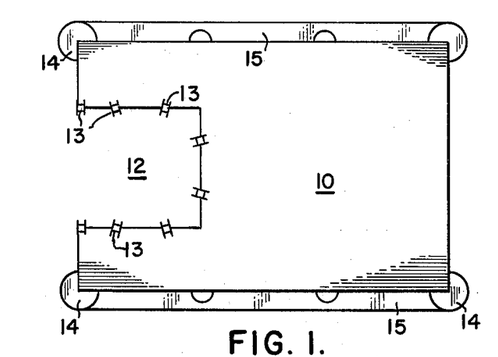
FIG. 1 is a schematic representation in plan view of a suitable floating semi-submersible platform which can be used in the column erecting process of this invention.
Figure 2:
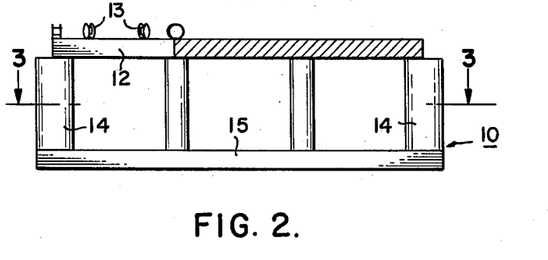
FIG. 2 is a front view, partly in section, of the platform shown in FIG. 1.
Figure 3:
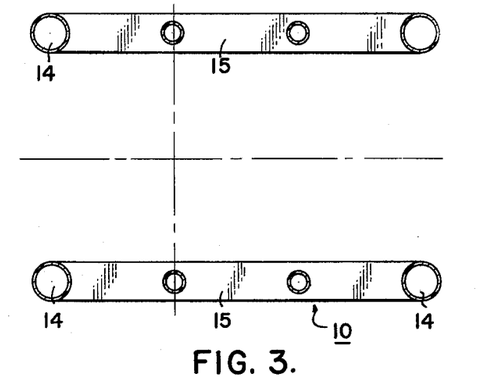
FIG. 3 is a view of the platform on line 3—3 in FIG. 2.

The erection process requires a conventional platform 10 (FIGS. 1-3) which preferably is a semi-submersible platform such as is used in the offshore oil drilling business. The platform typically includes a plurality of pontoons 15 interconnected to vertical columns 14. The platform defines a generally rectangular slot 12 on the periphery of which are operatively positioned a plurality of winches 13, preferably of the wire line type.

Figures 4, 4A:
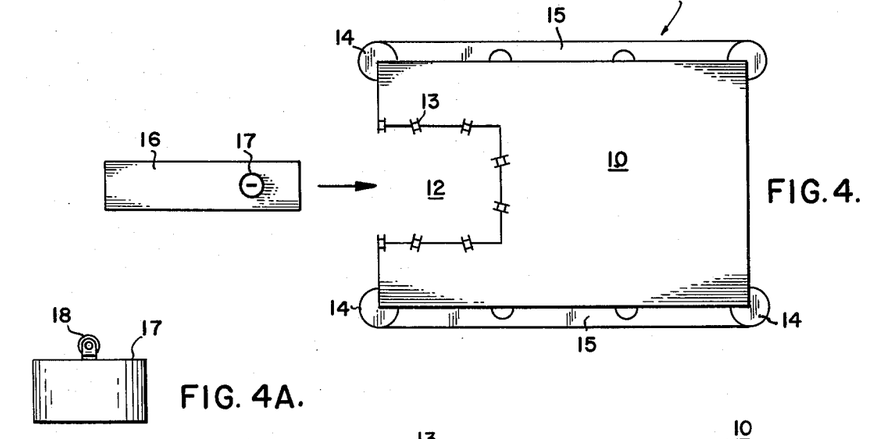
FIGS. 4 through 13 illustrate the steps for deploying a plurality of anchor weights in a predetermined pattern on the sea bed around the selected erection site for the column.
Figure 5:
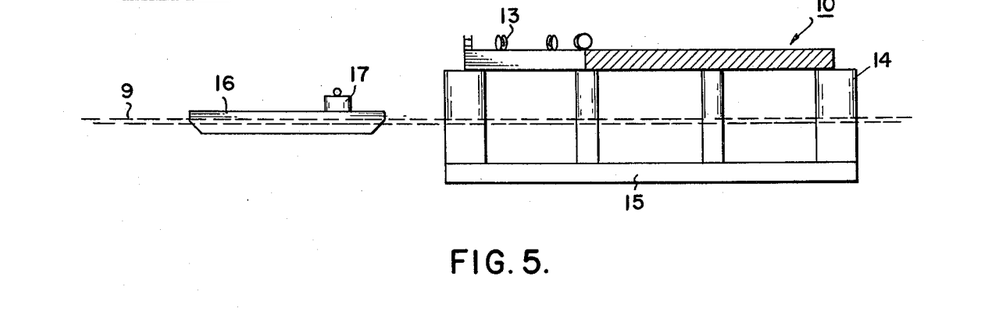
Figure 6:
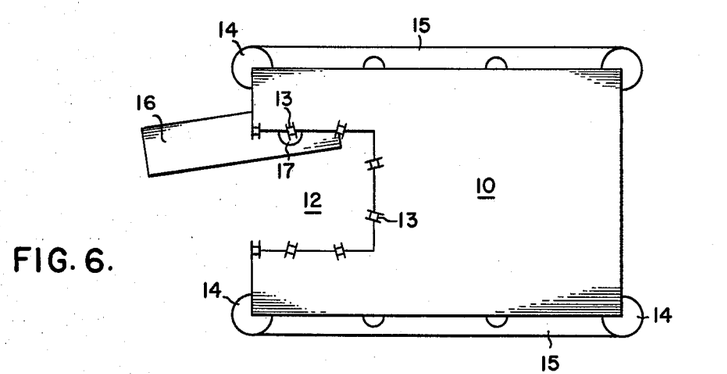
Figure 7:
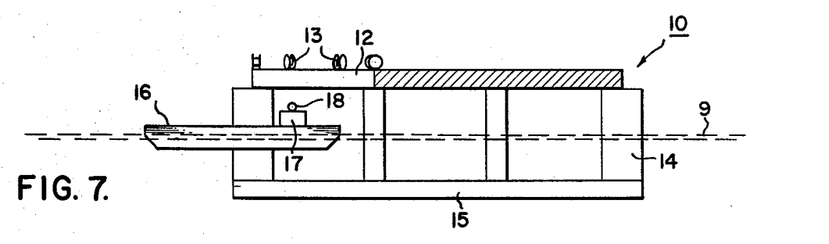
Figure 8:
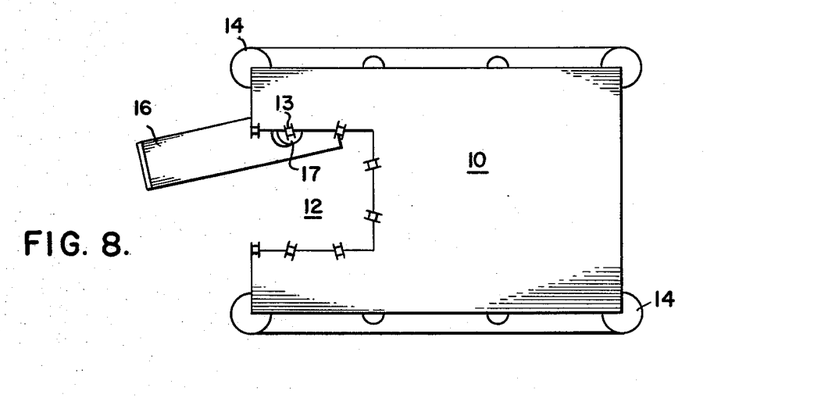
Figure 9:
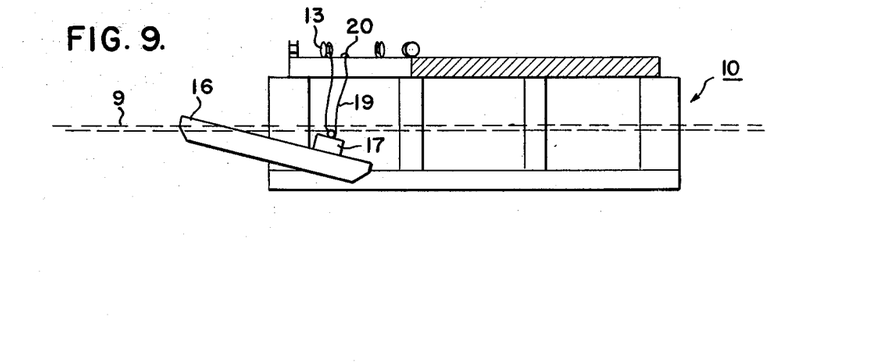
Figure 10:
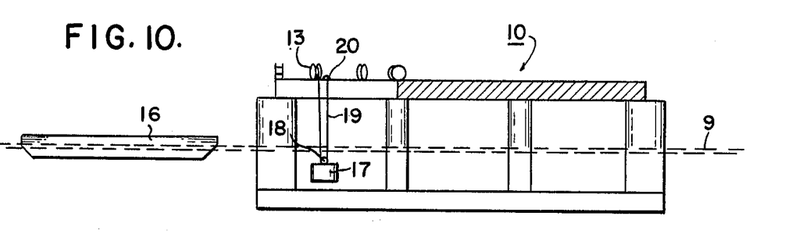
Figures 11, 13:
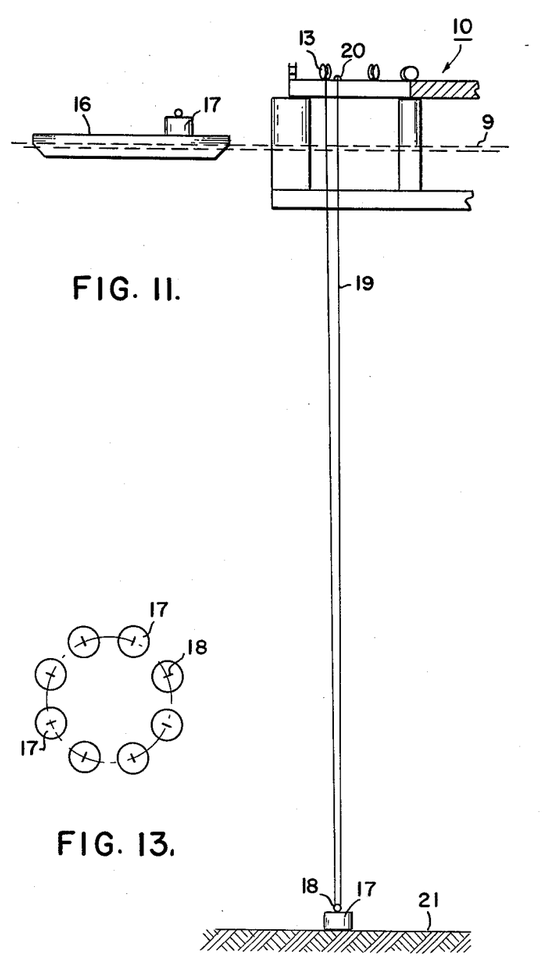
Figure 12:
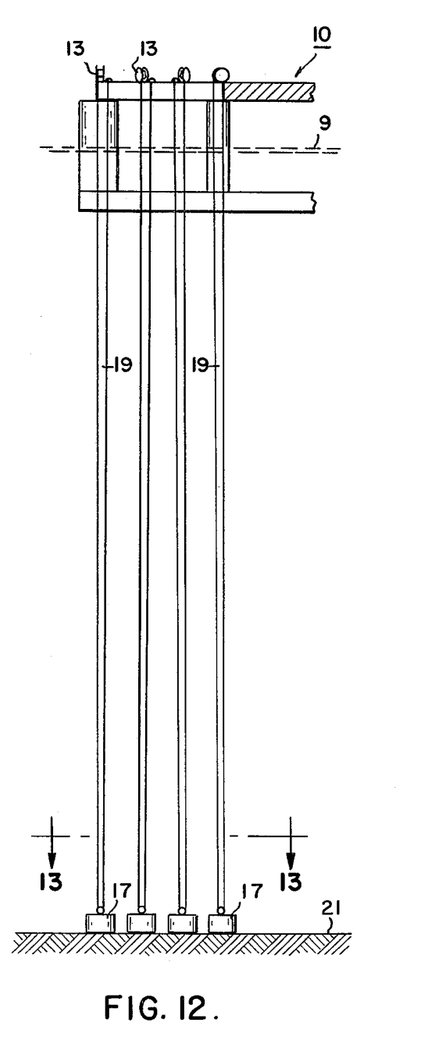

A suitable barge 16 (FIGS. 4, 4A, 5) is used to transport a plurality of large clump weight anchors 17 having sheaves 18. Barge 16 should be capable of being partially submerged and such barges are well known in the art. Barge 16 moves into slot 12 and carries the first weight 17. The barge is positioned so that weight 17 lies under a winch 13 (FIGS. 6-7). The winch's wire line 19 is looped through sheave 18 on weight 17 and its end is removably secured to a padeye 20 on platform 10. The end of barge 16 carrying weight 17 is submerged (FIGS. 8-9) to a depth sufficient to completely submerge the weight. Wire line 19 is then tensioned with winch 13 to support weight 17 (FIG. 10) which allows barge 16 to refloat and move away from platform 10 for bringing a second weight 17 (FIG. 11). In the meantime, the first weight 17 has been lowered to the bed 21. Barge 16 returns to slot 12 with the second weight 17, and the process is repeated until a desired plurality of weights 17 are positioned on bed 21 (FIGS. 12-13) in a predetermined pattern, preferably in a circular pattern with the weights 17 being equally spaced apart (FIG. 13).

B. ERECTION OF THE COLD WATER COLUMN

Figures 14, 15, 16, 17, 18:
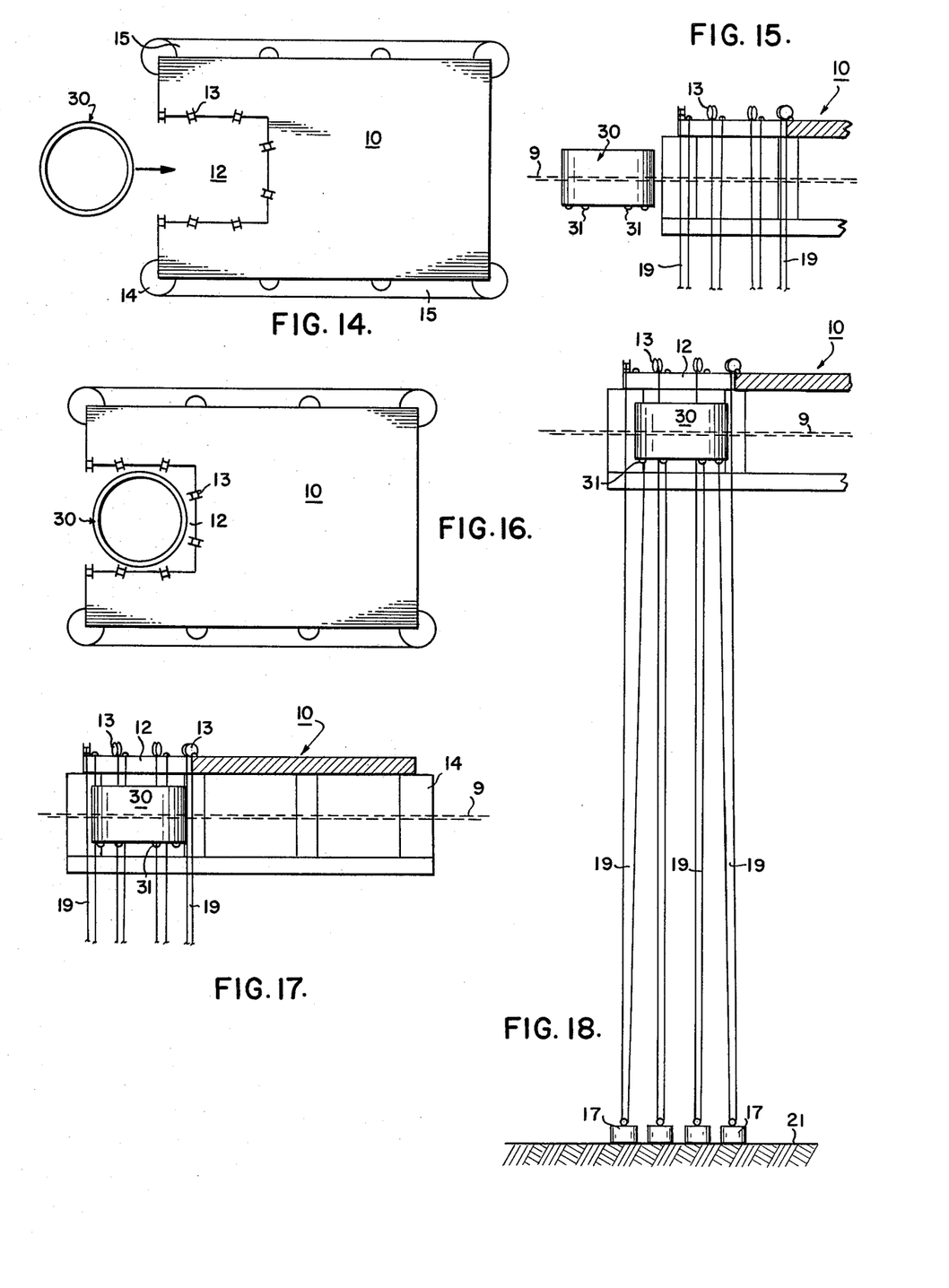
FIGS. 14 through 17 illustrate the steps used to float the first or lowermost columnar member into position relative to the platform and then attaching the winch lines to the bottom end thereof.
FIGS. 18 through 21 illustrate the manner of submerging the lowermost columnar member, positioning thereover the second columnar member, and using the buoyancy of the lowermost columnar member to lift completely out of the water the second columnar member.

The first or lowermost columnar member 30 is floated upright or erect towards platform 10 (FIGS. 14-15) for positioning within slot 12 (FIG. 16). The means for maneuvering member 30 can be any suitable conventional means and therefore they are not illustrated in the drawings. Member 30 has a net positive buoyancy and has a portion thereof submerged and a portion extending above the mean water level 9. A plurality of padeyes 31 are mounted on the bottom end of member 30 and after it its centered within slot 12 the bitter ends of wire lines 19 are attached to the padeyes 31 (FIG. 17). Thereafter the wire lines are pulled (FIG. 18) to fully submerge member 30 (FIG. 18).

Figure 19:
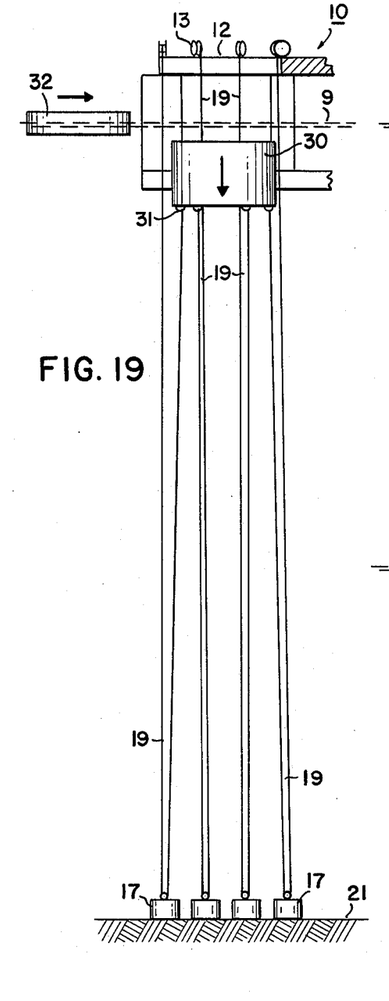
Figure 19A:
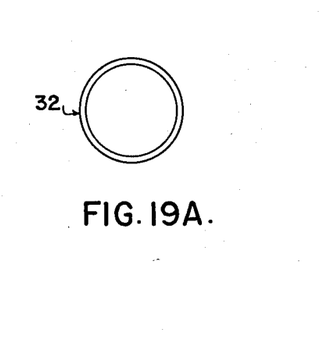
Figure 20:
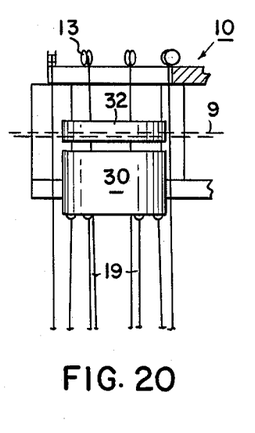
Figure 21:
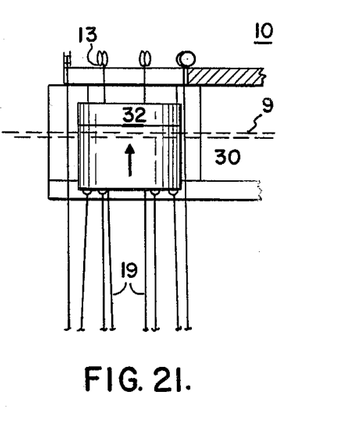

A second shorter columnar member 32 (FIGS. 19, 19A) also having a net positive buoyancy, is then positioned within slot 12 directly over member 30 (FIG. 20). The wire lines 19 are slackened to allow member 30 which has a sufficient positive buoyancy, to lift member 32 out of and above the water surface 9 so that a proper interconnection 62 (FIG. 29) therebetween can be made above the water surface (FIG. 20).

Figures 22, 23:
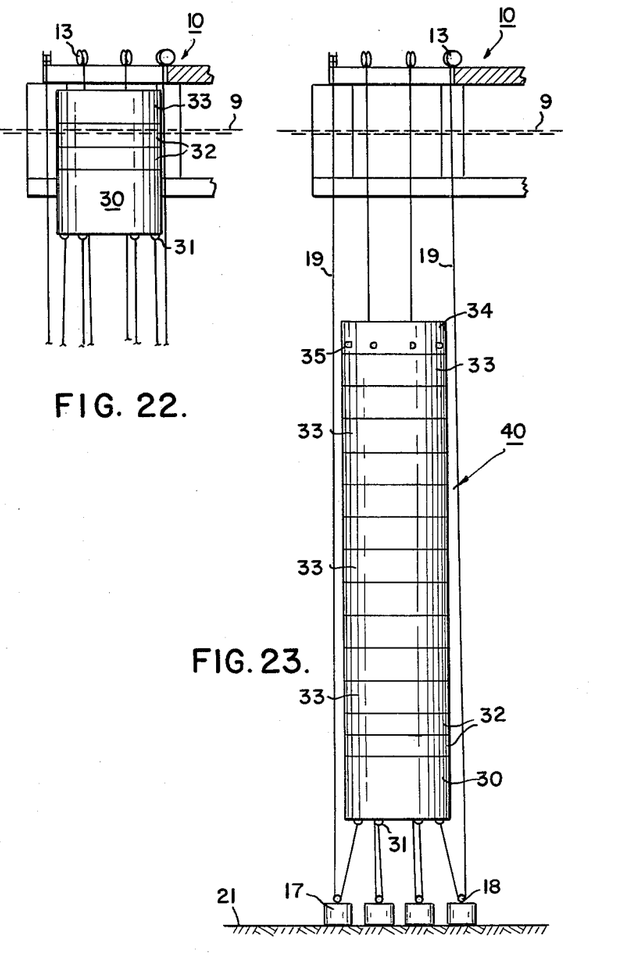
FIGS. 22 through 23 illustrate the steps for erecting a multi-member column and pulling it down to a predetermined height above the sea bed.

This process is repeated for another short member 32, then for larger standard size columnar members 33, and for the top or uppermost member 34 (FIGS. 22-23) until the entire column 40 is erected, and fully submerged by the winch lines 19.

Figure 29:
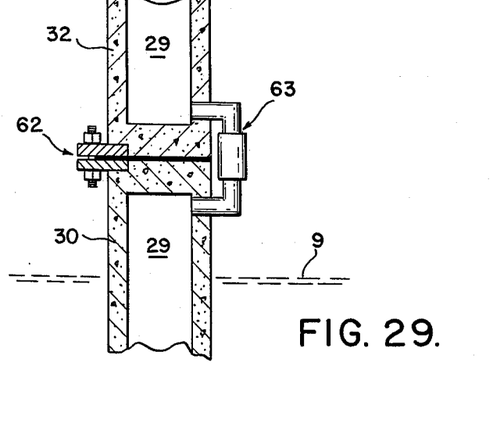
FIG. 29 illustrates the interconnections between each pair of columnar members.

Thus, first the connected columnar members are lowered by winching and made ready to receive an additional columnar member, then the winch lines are slackened to allow the buoyancy of the assembled columnar members to lift the additional columnar member. Each columnar member is provided with buoyancy chambers 29 (FIGS. 26-29) for controlling the net buoyancy of the columnar members during the erection process as well as the net buoyancy of the fully erected column 40. In the erected column 40, the buoyancy chambers 29 are in fluid communication with each other. For the purpose of illustration only, such fluid communication is illustrated by pipes 63 (FIG. 29). In this fashion, column 40 can be ballasted and deballasted, as required. This process allows the trimming of the buoyancy in connection with the pulling exerted by the winch lines 19.

Figures 24, 25:
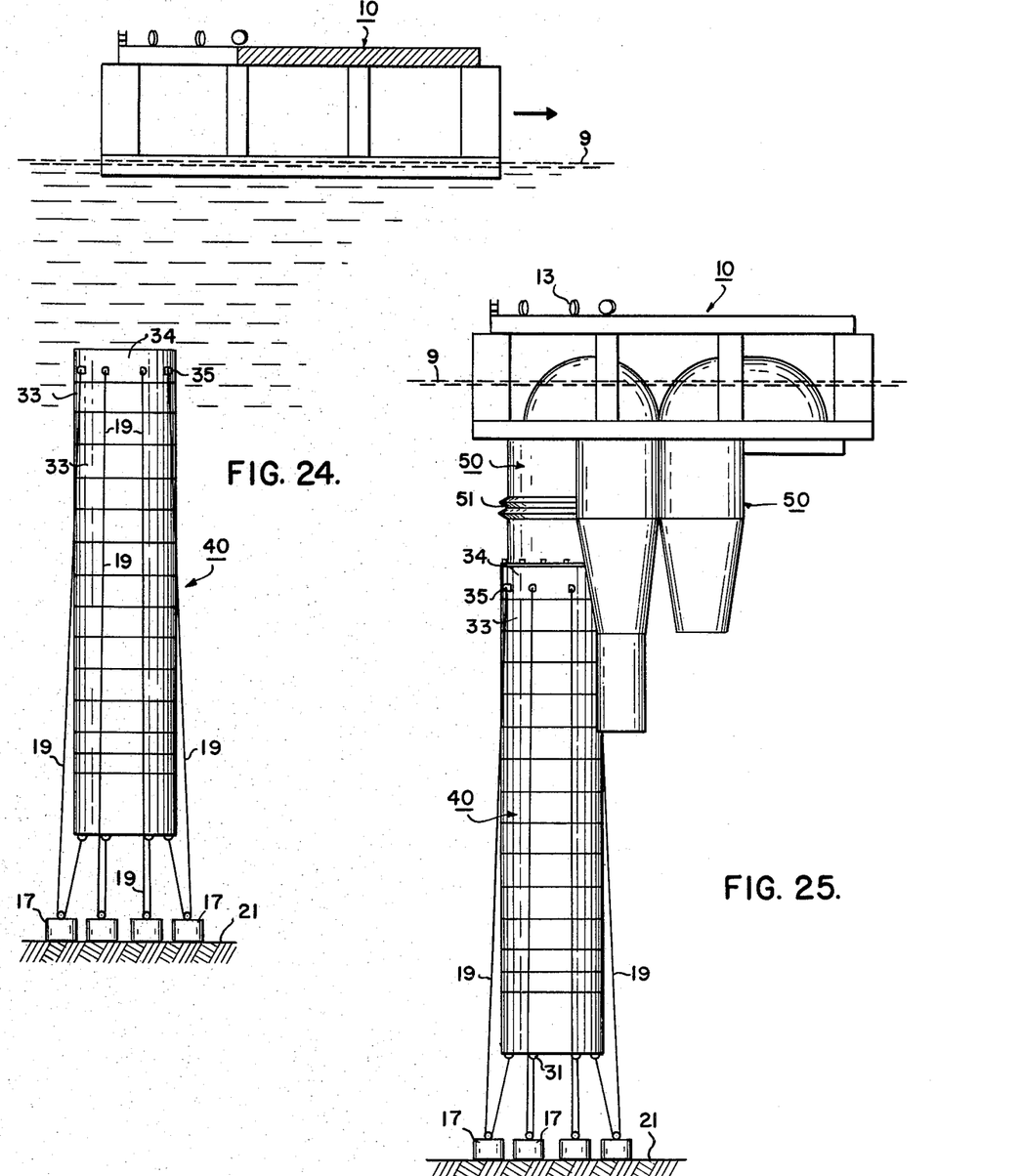
FIG. 24 illustrates the step of anchoring the erected column with the weights to the sea bed and detaching the platform from the column.
FIG. 25 illustrates the mounting of an OTEC platform over the erected anchored column.
Figure 26:
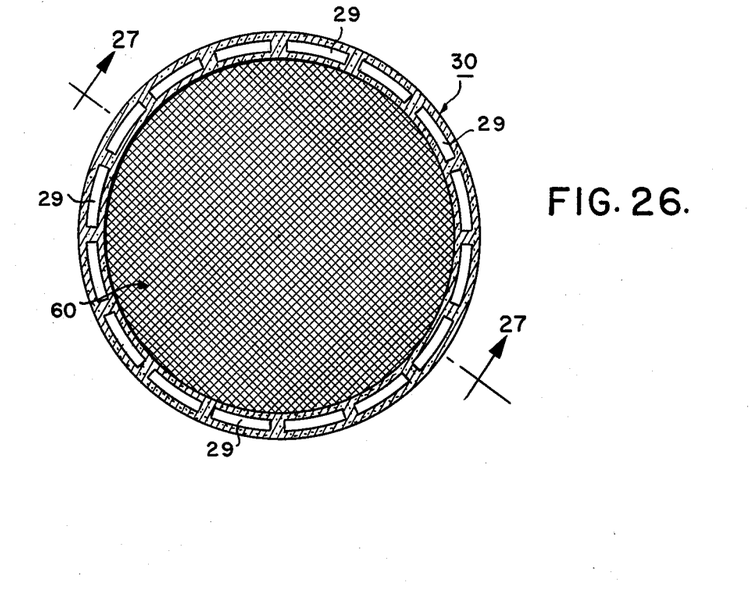
FIG. 26 is a horizontal sectional view of the lowermost columnar member showing watertight chambers used for ballasting and deballasting.
Figure 27:
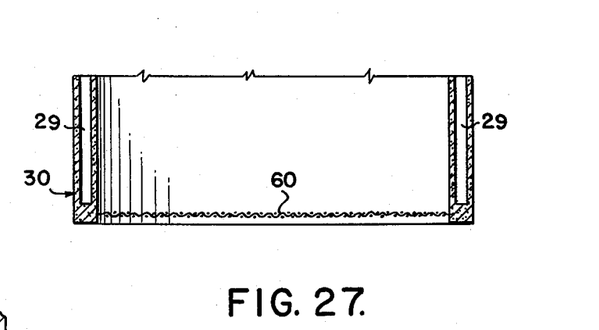
FIG. 27 is a vertical sectional view on line 27—27 of the columnar member shown in FIG. 26.
Figure 28:
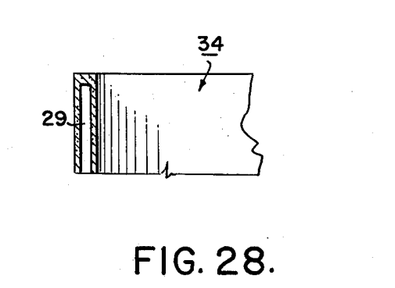
FIG. 28 is a partial sectional view of the upper end of the uppermost columnar member.

The top member 34 has a plurality of circumferentially spaced padeyes 35 (FIG. 23) and the bitter ends of the wire lines 19 are transferred from the winches 13 and secured to these padeyes 35 (FIG. 24).

The fully erected column 40 is submerged at a desired distance above the sea bed 21 and is anchored thereto by the weights 17 through the wire lines 19. Platform 10 is now removed and substituted with an OTEC platform 50 to which the erected column 40 is coupled by a completely pivotable joint 51 so as to decouple the movements of platform 50 from the erected column 40.

The lowermost member 30 is positioned at a sufficient distance above the sea bed 21 to prevent silt from being drawn into the column 40. It is desired also to provide a screen 60 to filter debris out from the pumped cold water through column 40 into the platform 50.

C. ILLUSTRATIVE EMBODIMENT

For columnar members having say an internal diameter of approximately 150 feet, the lowermost columnar member 30 may have a length approximately 100 feet and a 50% net buoyancy. The columnar member 32 may be about 30 feet long and have a 50% net buoyancy. Therefore, member 30 should be submerged by winching to about 20 feet below the mean water level 9 and have sufficient positive buoyancy to lift the member 32 completely out of the water, so that the necessary connection 62 (FIG. 29) can be made therebetween above the water level. Such connections 62 should be sufficiently rigid and watertight.

The third columnar member 32 and also have a 30 foot length. It is lifted out of the water by the buoyancy of the first and second members 30, 32 to about 10 feet above the water level. The net buoyancy of the connected columnar members is trimmed by the addition or removal of sea water to or from the interconnected chambers 29.

Columnar members 33 may have a length of 50 feet and have a 25% net buoyancy. The connected members (30, 32, 32) are lowered by winching to about 40 to 45 feet below the water level 9 to accept the first 50-foot columnar member 33. The process is then repeated for all the members 33 and the last or top member 34.

An important aspect of the invention is the use of the weights 17 on the sea bed 21 as anchors for pulling down the buoyant columnar members and the fully erected column. The completed column will be about 500 to 1,000 feet above the sea bed 21. The columnar members are interconnected to make water-tight connections therebetween which will withstand tension and bending loads. The lower portion of the fully erected column 40 has a negative buoyancy, while the upper portion has the required positive buoyancy. In this manner the column will remain erect. Ballast is added to the lowermost portion and buoyancy is added to the uppermost portion during the erection process.

What is claimed is:

1. A method for erecting a very large submerged columnar buoyant structure and anchoring the submerged columnar structure above a selected site on the sea bed to allow the structure to draw clean cold water from the sea bottom, comprising in combination the steps of:
   (1) providing a plurality of cylindrical columnar members for assembly one on top of the other, each partially assembled columnar members forming a sub-structure, said columnar members including a lowermost member having a plurality of hooks on the bottom end thereof, a second columnar member shorter than said lowermost columnar member, and an uppermost columnar member having a plurality of circumferentially spaced hooks, each columnar member having an inherent net positive buoyancy and defining therein watertight chambers;
   (2) providing a platform having on a portion of its periphery a plurality of operatively positioned wireline winches;
   (3) providing a transport barge adapted to become partially submerged;
   (4) providing a plurality of anchor weights, each weight having a sheave thereon;
   (5) transporting with said barge and deploying said weights on said selected site by suspending said weights from said wirelines;
   (6) consecutively erecting said columnar members utilizing said suspended weights to pull down each assembled sub-structure;
   (7) securely interconnecting said members and fluidly connecting the chambers of said columnar members utilizing said inherent positive buoyancy to lift the columnar members out of the water for the purpose of making said connections above the water surface;
   (8) ballasting said columnar members with sea water, whereby said fully erected columnar structure is at a desired distance above the seabed; and
   (9) anchoring the submerged columnar structure to the sea bed using said weights attached to said wirelines.

2. A method for erecting a very large submerged columnar buoyant structure and anchoring the submerged columnar structure to a preselected site on the sea bed, comprising in combination the steps of:
   (1) providing a platform having on a portion of its periphery a plurality of operatively positioned wireline winches and a plurality of hooks;
   (2) providing a transport barge which can be controllably and partially submerged;
   (3) providing a plurality of columnar members, each member having an inherent net positive buoyancy and defining therein watertight chambers which are adapted to accept sea water therein for ballasting said member, the lowermost columnar member having a plurality of spaced hooks on the bottom end thereof, and the uppermost columnar member having a plurality of spaced hooks thereon;
   (4) transporting with said barge a plurality of anchors each anchor having a sheave thereon;
   (5) deploying said plurality of anchors on said preselected site by
      (a) consecutively positioning said barge so that each anchor lies under a corresponding winch on said platform;
      (b) looping the wireline of said corresponding winch through the sheave on the corresponding anchor, and removably securing the outer end of said wireline to one hook on said platform;
      (c) submerging said barge whereby said corresponding anchor becomes completely submerged;
      (d) tensioning said wireline of said corresponding winch to thereby support said anchor on said wireline and to allow said barge to refloat; and
      (e) lowering said supported anchor to the sea bed on said wireline;
   (6) erecting said columnar structure by:
      (a) positioning said lowermost columnar member upright near said platform, detaching said outer ends of said wirelines from said platform and attaching them to said hooks on said lowermost member;
      (b) winching said wirelines to thereby fully submerge said lowermost member;
      (c) positioning a second columnar member directly over said lowermost member;
      (d) slackening said wirelines to allow the buoyancy of said lowermost member to completely lift said second columnar member above the water surface;
      (e) securely interconnecting said lowermost and second columnar members and fluidly interconnecting the chambers in said lowermost and second columnar members;
      (f) winching said wirelines to thereby fully submerge said lowermost and second columnar members;
      (g) positioning a third columnar member directly over said second columnar member;

(h) slackening said wirelines to allow the buoyancy of said lowermost and second columnar members to completely lift said third columnar member above the water surface;

(i) fluidly interconnecting the chambers in said second and third columnar members; and (j) repeating steps 6(a) through 6(i) for the remaining columnar members until said uppermost columnar member is securely and fluidly interconnected with the next to the uppermost columnar member, utilizing said inherent positive buoyancy to lift the columnar members out of the water for the purpose of making said connections above the water surface; and (7) detaching the ends of said wirelines from said platform and attaching them to the top end portion of the erected columnar structure, whereby said structure becomes anchored to the sea bed by said anchors attached to said wirelines.

3. A method for erecting a very large submerged columnar buoyant structure and anchoring the submerged columnar structure above a preselected site on the sea bed, said columnar structure being adapted to carry cold water from the sea bed to a utilization device on the water surface, comprising in combination the steps of:

(1) providing a platform having on a portion of its periphery a plurality of operatively positioned wireline winches;

(2) providing a transport barge adapted to be controllably and partially submerged;

(3) providing a plurality of cylindrical columnar members, each member having an inherent net positive buoyancy and defining therein watertight chambers which are adapted to accept sea water for ballasting said member, and the lowermost columnar member having a plurality of circumferentially spaced hooks on the bottom end thereof;

(4) transporting a plurality of anchors with said barge, each anchor having a sheave thereon;

(5) deploying said plurality of anchors around said preselected site on said sea bed by:

(a) positioning said barge so that each anchor lies under a corresponding winch on said platform;

(b) looping the wireline of said corresponding winch through the sheave on the corresponding anchor and removably securing the outer end of said wireline to one hook on said platform;

(c) submerging said barge whereby said anchor becomes completely submerged;

(d) tensioning said hooked wireline to thereby support said anchor and to allow said barge to refloat;

(e) lowering said supported anchor to the sea bed on said wireline; and (f) repeating steps 5(a) through 5(e) until said plurality of anchors are positioned on the sea bed in a circular configuration;

(6) erecting said columnar structure by:

(a) positioning said lowermost columnar member upright near said platform, detaching said outer ends of said wirelines from said platform and attaching them to said hooks of said lowermost columnar member;

(b) winching said wirelines to thereby fully submerge said lowermost columnar member;

(c) positioning a second columnar member directly over said lowermost columnar member;

(d) slackening said wirelines to allow the buoyancy of said lowermost member to completely lift said second columnar member above the water surface;

(e) fluidly interconnecting the chambers in said lowermost and second columnar members;

(f) winching said wirelines to thereby fully submerge said lowermost and second columnar members;

(g) positioning a third columnar member directly over said second columnar member;

(h) slackening said wirelines to allow the combined buoyancy of said lowermost and second columnar members to completely lift said third columnar member above the water surface;

(i) fluidly interconnecting the chambers in said second and third columnar members;

(j) repeating steps 6(b) through 6(i) until said uppermost columnar member is fluidly interconnected with the next to the uppermost columnar member, utilizing said inherent positive buoyancy to lift the columnar members out of the water for the purpose of making said connections above the water surface; and (k) submerging the fully erected columnar structure by suitably ballasting said columnar members to a desired elevation above the sea bed;

(7) detaching the ends of said wirelines from said platform and attaching them to the top end portion of said erected columnar structure, whereby said structure becomes anchored to the sea bed by said anchors;

(8) removing said platform from the vicinity of said erected columnar structure;

(9) positioning a deck carrying a water utilization device directly over and coupling said utilization device to said erected columnar structure;

(10) fluidly coupling said utilization device with the fluid passageway through said columnar structure; and (11) pumping cold water from beneath said lowermost columnar member through said passageway to said utilization device.

* * * * *